(12) United States Patent
Park et al.

(10) Patent No.: US 12,494,541 B2
(45) Date of Patent: Dec. 9, 2025

(54) BATTERY MODULE AND BATTERY PACK INCLUDING THE SAME

(71) Applicant: LG ENERGY SOLUTION, LTD., Seoul (KR)

(72) Inventors: Subin Park, Daejeon (KR); Junyeob Seong, Daejeon (KR); Myungki Park, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 705 days.

(21) Appl. No.: 17/783,384

(22) PCT Filed: Jul. 30, 2021

(86) PCT No.: PCT/KR2021/010018
§ 371 (c)(1),
(2) Date: Jun. 8, 2022

(87) PCT Pub. No.: WO2022/030900
PCT Pub. Date: Feb. 10, 2022

(65) Prior Publication Data
US 2023/0013878 A1    Jan. 19, 2023

(30) Foreign Application Priority Data
Aug. 7, 2020 (KR) .......... 10-2020-0099098

(51) Int. Cl.
*H01M 50/242* (2021.01)
*H01M 50/211* (2021.01)
(Continued)

(52) U.S. Cl.
CPC ....... *H01M 50/242* (2021.01); *H01M 50/211* (2021.01); *H01M 50/244* (2021.01);
(Continued)

(58) Field of Classification Search
None
See application file for complete search history.

(56) References Cited

U.S. PATENT DOCUMENTS

2013/0330584 A1  12/2013  Lee et al.
2015/0171401 A1   6/2015  Kim et al.
(Continued)

FOREIGN PATENT DOCUMENTS

CN    103492892 A    1/2014
CN    104412417 A    3/2015
(Continued)

OTHER PUBLICATIONS

Machine Translation of CN 207925546 (Year: 2018).*
(Continued)

*Primary Examiner* — Gregg Cantelmo
(74) *Attorney, Agent, or Firm* — Birch, Stewart, Kolasch & Birch, LLP (57) ABSTRACT

A battery module includes a battery cell stack in which a plurality of battery cells are stacked, a module frame for housing the battery cell stack, and an end plate for covering the front and rear surfaces of the battery cell stack and coupled to the module frame, wherein the end plate is formed of an insulating material.

15 Claims, 8 Drawing Sheets

(51) Int. Cl.
  *H01M 50/244* (2021.01)
  *H01M 50/273* (2021.01)
  *H01M 50/278* (2021.01)
  *H01M 50/291* (2021.01)
  *H01M 50/502* (2021.01)
  *H01M 50/505* (2021.01)

(52) U.S. Cl.
  CPC ....... *H01M 50/273* (2021.01); *H01M 50/278* (2021.01); *H01M 50/291* (2021.01); *H01M 50/502* (2021.01); *H01M 50/505* (2021.01)

(56) References Cited

U.S. PATENT DOCUMENTS

| | | | |
|---|---|---|---|
| 2018/0138565 A1* | 5/2018 | Lee | H01M 10/6554 |
| 2018/0358588 A1 | 12/2018 | Sato et al. | |
| 2019/0006647 A1 | 1/2019 | Ryu et al. | |
| 2019/0131596 A1 | 5/2019 | Yang et al. | |
| 2019/0245169 A1 | 8/2019 | Kim et al. | |
| 2020/0006823 A1 | 1/2020 | Chung et al. | |
| 2020/0020915 A1 | 1/2020 | Chi et al. | |
| 2020/0106065 A1 | 4/2020 | Ito | |
| 2020/0152931 A1 | 5/2020 | Kim et al. | |
| 2021/0194101 A1 | 6/2021 | Kim et al. | |
| 2021/0288387 A1 | 9/2021 | Cho | |
| 2021/0313657 A1 | 10/2021 | Park et al. | |
| 2021/0336287 A1 | 10/2021 | Kim et al. | |
| 2021/0359357 A1 | 11/2021 | Chung et al. | |
| 2022/0247004 A1 | 8/2022 | Yun | |
| 2022/0376340 A1 | 11/2022 | Park et al. | |

FOREIGN PATENT DOCUMENTS

| | | | | | |
|---|---|---|---|---|---|
| CN | 106785225 A | * | 5/2017 | | H01M 10/04 |
| CN | 107768566 A | * | 3/2018 | | H01M 50/20 |
| CN | 207925546 U | * | 9/2018 | | |
| CN | 109037506 A | | 12/2018 | | |
| CN | 109844990 A | | 6/2019 | | |
| CN | 110603662 A | | 12/2019 | | |
| CN | 110915019 A | | 3/2020 | | |
| CN | 111066173 A | | 4/2020 | | |
| EP | 4 016 711 A1 | | 6/2022 | | |
| JP | 2009-238643 A | | 10/2009 | | |
| JP | 2014-516457 A | | 7/2014 | | |
| JP | 6212914 B2 | | 10/2017 | | |
| JP | 2019-502250 A | | 1/2019 | | |
| JP | 6647738 B2 | | 2/2020 | | |
| JP | 2020-57520 A | | 4/2020 | | |
| JP | 2020-522855 A | | 7/2020 | | |
| JP | 2020-523749 A | | 8/2020 | | |
| KR | 10-2013-0110943 A | | 10/2013 | | |
| KR | 10-1478704 B1 | | 1/2015 | | |
| KR | 10-2017-0036639 A | | 4/2017 | | |
| KR | 10-2017-0094981 A | | 8/2017 | | |
| KR | 10-2018-0071800 A | | 6/2018 | | |
| KR | 10-2019-0001407 A | | 1/2019 | | |
| KR | 10-2050530 B1 | | 12/2019 | | |
| KR | 10-2020-0003600 A | | 1/2020 | | |
| KR | 10-2020-0008624 A | | 1/2020 | | |
| KR | 10-2089645 B1 | | 3/2020 | | |
| KR | 10-2020-0040614 A | | 4/2020 | | |
| KR | 10-2020-0086170 A | | 7/2020 | | |
| WO | WO-2017069045 A1 | * | 4/2017 | ........ | H01M 10/0404 |
| WO | WO 2019/123535 A1 | | 6/2019 | | |
| WO | WO 2019/208938 A1 | | 10/2019 | | |
| WO | WO 2020/075988 A1 | | 4/2020 | | |

OTHER PUBLICATIONS

Machine Translation of CN 107768556A (Year: 2018).*
Machine Translation of CN 106785225A (Year: 2017).*
Machine Translation of WO2017069045A1 (Year: 2017).*
Partial Supplementary European Search Report for European Application No. 21853628.2, dated Oct. 5, 2023.
Extended European Search Report for European Application No. 21853628.2, dated Feb. 1, 2024.
International Search Report (PCT/ISA/210) issued in PCT/KR2021/010018 mailed on Nov. 11, 2021.

\* cited by examiner

[FIG. 1]

Conventional Art

[FIG. 2]

Conventional Art

BATTERY MODULE AND BATTERY PACK INCLUDING THE SAME

CROSS CITATION WITH RELATED APPLICATION(S)

This application claims the benefit of Korean Patent Application No. 10-2020-0099098 filed on Aug. 7, 2020 with the Korean Intellectual Property Office, the disclosure of which is incorporated herein by reference in its entirety.

The present disclosure relates to a battery module and a battery pack including the same, and more particularly, to a battery module having anti-crush structure and a battery pack including the same.

TECHNICAL FIELD

Background

With the technological development and the increase of demand for a mobile device, demand for a secondary battery as an energy source is rapidly increasing. Accordingly, many researches of the battery capable of meeting a variety of needs are emerging.

A secondary battery has attracted considerable attention as an energy source for power-driven devices, such as an electric bicycle, an electric vehicle, and a hybrid electric vehicle, as well as an energy source for mobile devices, such as a mobile phone, a digital camera, and a laptop computer.

Small-sized mobile devices use one or several battery cells for each device, whereas middle or large-sized devices such as vehicles require high power and large capacity. Therefore, a middle or large-sized battery module having a plurality of battery cells electrically connected to one another is used.

The middle or large-sized battery module is preferably produced so as to have as small a size and weight as possible. Consequently, a prismatic battery, a pouch-shaped battery or the like, which can be stacked with high integration and has a small weight relative to capacity, is mainly used as a battery cell of the middle or large-sized battery module. In order for the medium or large-sized battery module to provide the output and capacity required in a given apparatus or device, a plurality of battery cells must be electrically connected in series.

On the other hand, in order to protect the battery cell stack from external impact, heat or vibration, the battery module may include a module frame for housing the battery cell stack in an internal space, and a metal end plate for covering the front and rear surfaces of the battery cell stack.

Figure 1:
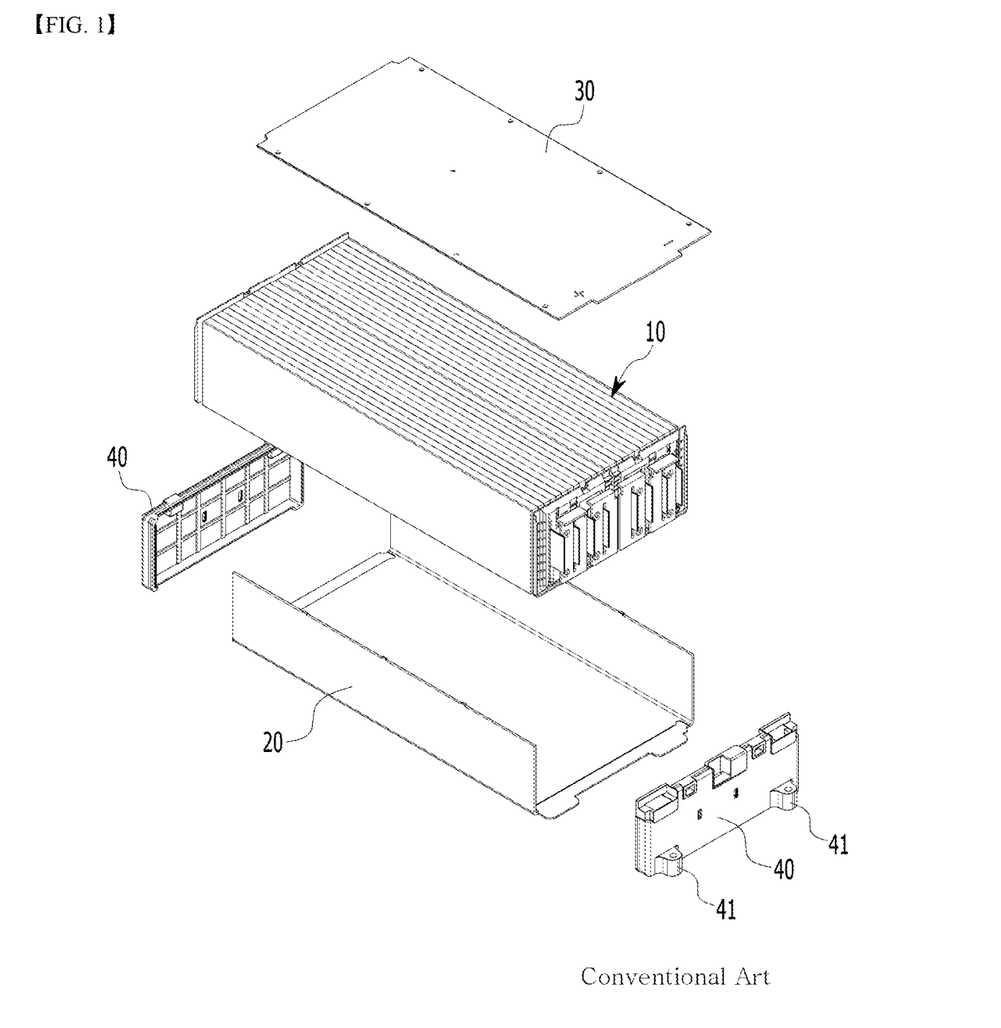
FIG. 1 is an exploded perspective view showing a conventional battery module.
Figure 2:
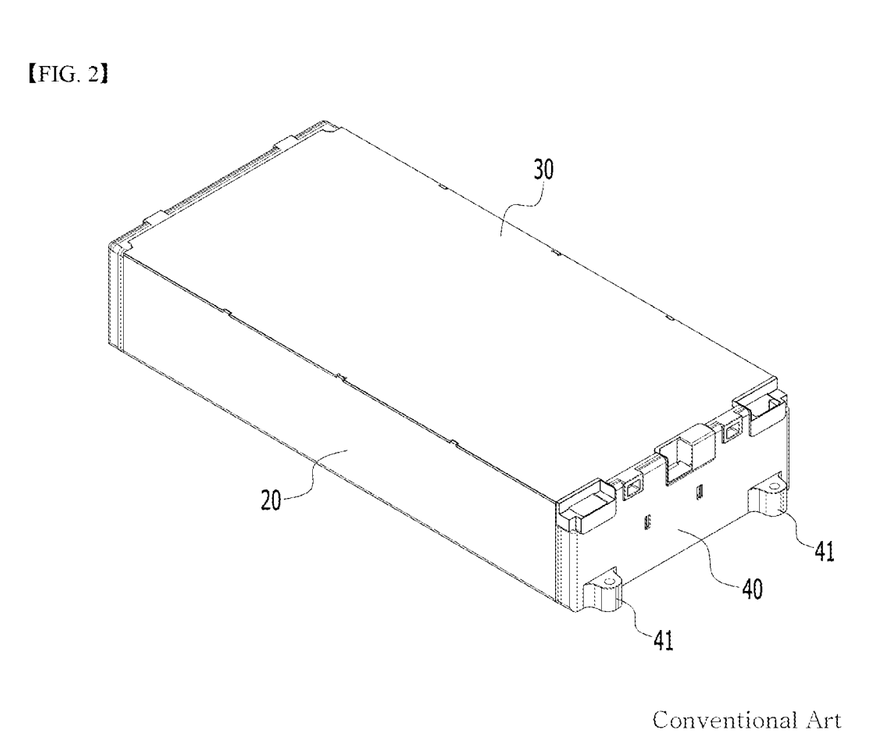
FIG. 2 is a perspective view showing a state in which the components of FIG. 1 are assembled.

FIG. 1 is an exploded perspective view showing a conventional battery module. FIG. 2 is a perspective view showing a state in which the components of FIG. 1 are assembled.

Referring to FIGS. 1 and 2, a conventional battery module includes a battery cell stack 10 formed by stacking a plurality of battery cells, a lower frame 20 for covering the lower surface and both side surfaces of the battery cell stack 10, an upper plate 30 for covering the upper surface of the battery cell stack 10, and an end plate 40 for covering the front and rear surfaces of the battery cell stack 10.

At this time, two module mounting parts 41 formed protrusively from the plate surface are formed on the lower side of the end plate 40, and when a physical force such as vibration or impact is applied to the battery module, stress is concentrated on the module mounting part 41 formed protrusively from the end plate 40, and there is a risk that the module mounting portion 41 is broken from the end plate 40. Further, even when a compressive force acts on the battery module, the load is concentrated on the module mounting part 41, and the end plate 40 connected to the module mounting part 41 is subjected to pressure and deformed, and a short circuit phenomenon may occur between the electrode leads inside the end plate.

DETAILED DESCRIPTION OF THE INVENTION

Technical Problem

It is an object of the present disclosure to provide a battery module having anti-crush structure and a battery pack including the same.

However, the technical problem to be solved by embodiments of the present disclosure is not limited to the above-described problems, and can be variously expanded within the scope of the technical idea included in the present disclosure.

Technical Solution

According to one embodiment of the present disclosure, there is provided a battery module comprising: a battery cell stack in which a plurality of battery cells are stacked in a first direction, a module frame for housing the battery cell stack, and an end plate for covering one of a front surface and a rear surface of the battery cell stack and coupled to the module frame, wherein the end plate is formed of an insulating material.

The front surface and the rear surface of the battery cell stack may be positioned in a second direction in which the electrode leads of the battery cells protrude, the second direction may be perpendicular to the first direction.

The battery module further comprises a bus bar frame positioned between the battery cell stack and the end plate, and a bus bar positioned on the bus bar frame, wherein the electrode leads are coupled to the bus bar, and coupling parts of the electrode leads and the bus bar may be formed in plural numbers.

A support member is formed on an inside surface of the end plate, and the support member may have a structure protruding toward the bus bar frame.

The support member may be positioned between the coupling parts adjacent to each other of the electrode lead and the bus bar.

The module frame comprises a lower frame on which the battery cell stack is mounted and an upper plate that covers an upper surface of the battery cell stack, and at least one module mounting part may be formed at each end of the upper plate.

The end plate may be fixed to at least one of the lower frame and the upper plate by an adhesive.

The end plate may be coupled to at least one of the lower frame and the upper plate by a hook structure.

The upper plate may protrude more than the width between both side parts of the lower frame to form a protruding part, and the at least one module mounting part may be formed on the protruding part.

The at least one module mounting part may be a plurality of mounting parts along opposite ends of the upper plate.

The at least one module mounting part may be a hole structure.

The lower frame may include a bottom part, and side parts formed by bending at opposite sides of the bottom part.

A width of the upper plate may be wider than a distance between the side parts of the lower frame.

The end plate may be formed by injection molding.

According to one embodiment of the present disclosure, there is provided a battery pack comprising the above-mentioned battery module.

Advantageous Effects

According to embodiments of the present disclosure, by using an end plate formed of an insulating material instead of the end plate formed of a metal material, it is possible to prevent a short circuit between the battery cells in the protruding direction of the electrode lead when a crush occurs.

Further, by forming the support member inside the end plate, it is possible to prevent the support member from being in close contact with the bus bar frame and causing a short circuit between adjacent electrode leads when a crush occurs.

By forming the end plate of the insulating material by an injection process, the structure of the battery module can be simplified and the weight of the battery module can be reduced.

The effects of the present disclosure are not limited to the effects mentioned above and additional other effects not described above will be clearly understood from the description of the appended claims by those skilled in the art.

DETAILED DESCRIPTION OF THE EMBODIMENTS

Hereinafter, various embodiments of the present disclosure will be described in detail with reference to the accompanying drawings so that those skilled in the art can easily carry out them. The present disclosure may be modified in various different ways, and is not limited to the embodiments set forth herein.

Portions that are irrelevant to the description will be omitted to clearly describe the present disclosure, and like reference numerals designate like elements throughout the specification.

Further, in the drawings, the size and thickness of each element are arbitrarily illustrated for convenience of the description, and the present disclosure is not necessarily limited to those illustrated in the drawings. In the drawings, the thickness of layers, regions, etc. are exaggerated for clarity. In the drawings, for convenience of the description, the thicknesses of some layers and regions are shown to be exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed "on" or "above" the reference portion toward the opposite direction of gravity.

Further, throughout the specification, when a portion is referred to as "including" a certain component, it means that the portion can further include other components, without excluding the other components, unless otherwise stated.

Further, throughout the specification, when referred to as "planar", it means when a target portion is viewed from the upper side, and when referred to as "cross-sectional", it means when a target portion is viewed from the side of a cross section cut vertically.

Hereinafter, a configuration of a battery module including an upper plate according to an embodiment of the present disclosure will be described with reference to FIGS. 3 and 4.

Figure 3:
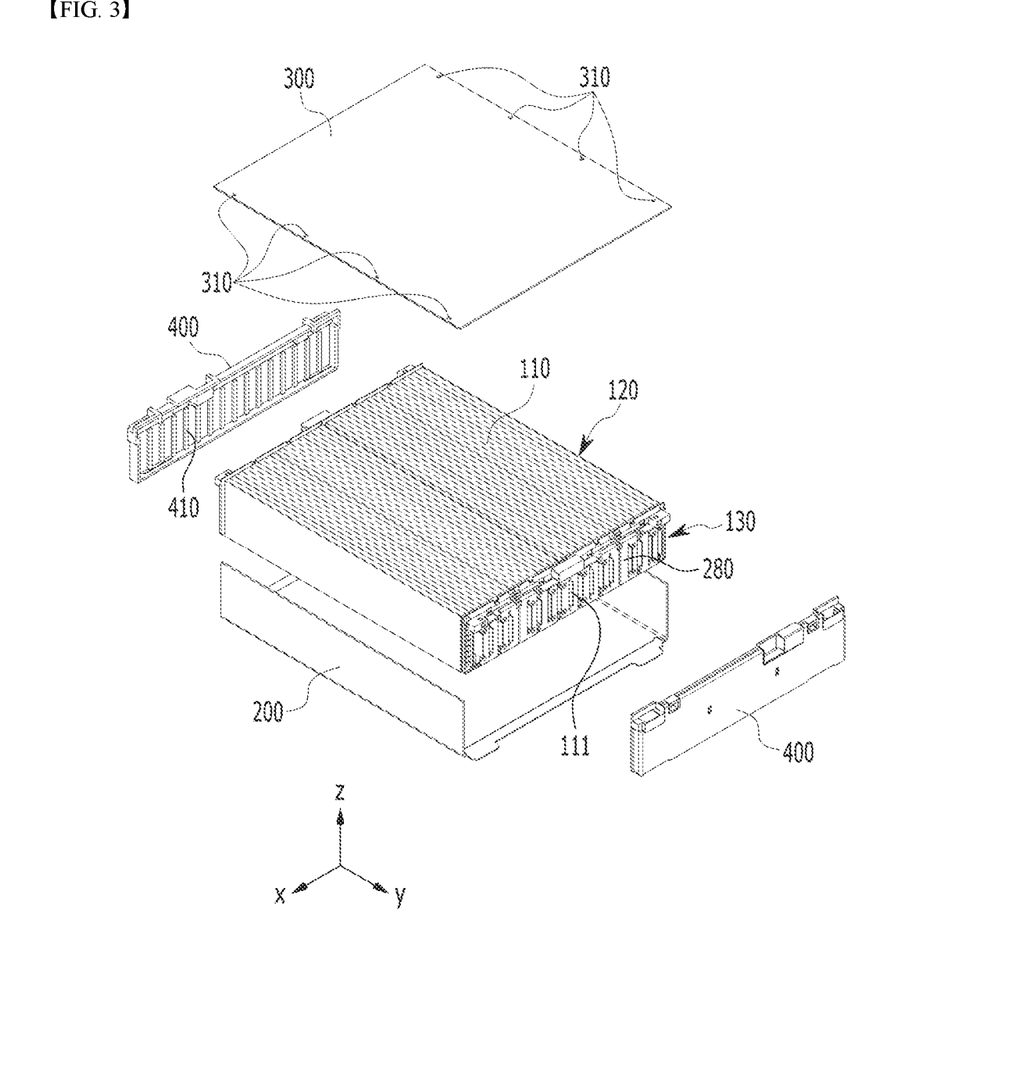
FIG. 3 is an exploded perspective view showing a battery module according to an embodiment of the present disclosure.

FIG. 3 is an exploded perspective view showing a battery module according to an embodiment of the present disclosure. FIG. 4 is a perspective view showing an assembled state of the components of FIG. 3. FIG. 5 is a perspective view of a battery cell included in the battery module of FIG. 3.

Figure 4:
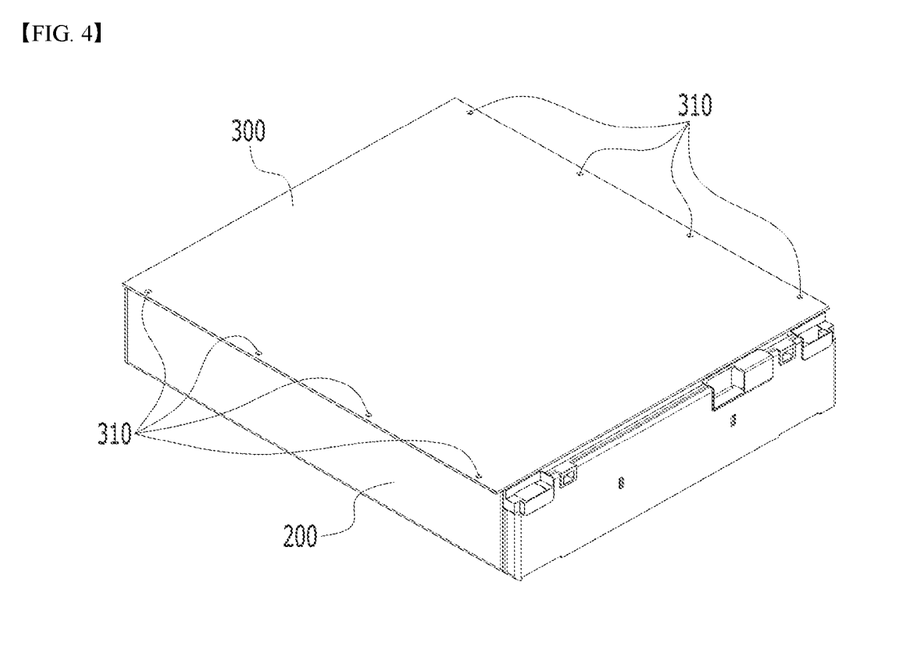
FIG. 4 is a perspective view showing an assembled state of the components of FIG. 3.
Figure 5:
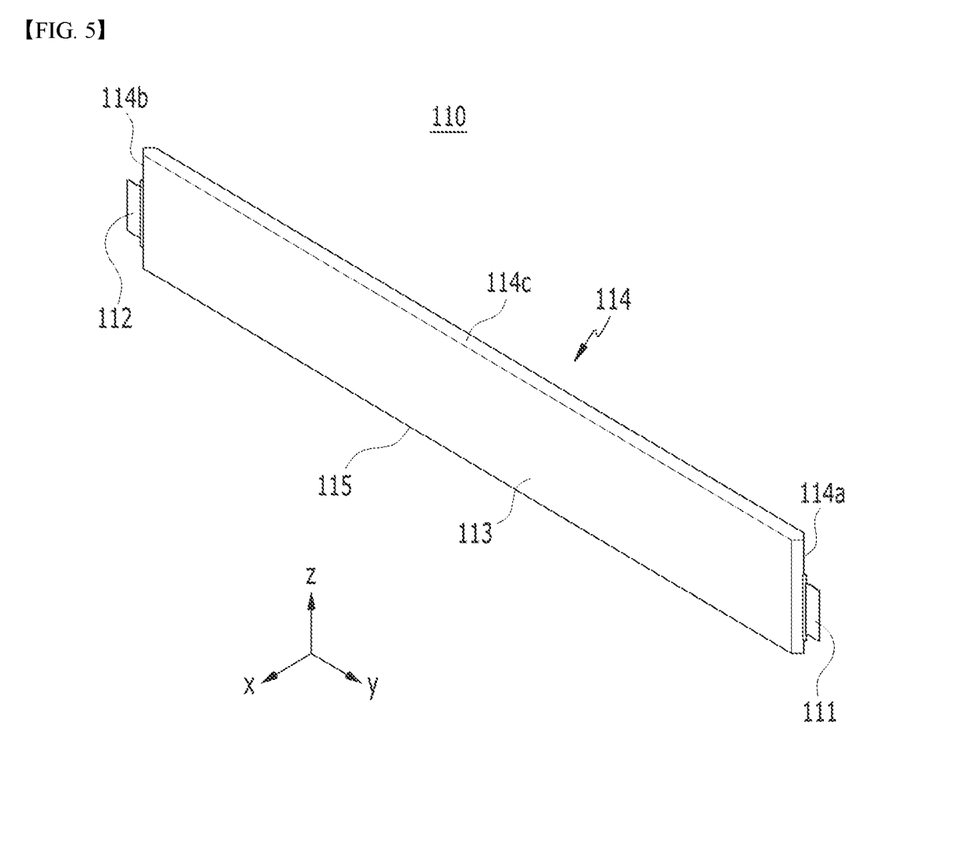
FIG. 5 is a perspective view of a battery cell included in the battery module of FIG. 3.

Referring to FIGS. 3 and 4, a battery module according to one embodiment of the present disclosure includes a battery cell stack 120 in which a plurality of battery cells 110 are stacked, a lower frame 200 for housing the battery cell stack 120, an upper plate 300 for covering an upper surface of the battery cell stack 120, and end plates 400 for covering the front and rear surfaces of the battery cell stack 120, wherein the module mounting parts 310 are formed at both ends of the upper plate 300. The lower frame 200 may have a U-shaped frame structure as one example, wherein the lower frame 200 may be composed of a bottom part, and side parts that are bent at both sides of the bottom part to cover the side surface of the battery cell stack 120. In this manner, as an example of the module frame for housing the battery cell stack 120, the lower frame 200 having a U-shaped frame structure and the upper plate 300 can be included.

The battery cell 110 according to the present embodiment is a secondary battery and can be configured into a pouch-type secondary battery. The battery cells 110 can be configured in plural numbers, and the plurality of battery cells can be stacked so as to be electrically connected to each other, thereby forming a battery cell stack 120. The plurality of battery cells 110 may include an electrode assembly, a cell case, and an electrode lead protruding from the electrode assembly, respectively.

The lower frame 200 may be formed so as to cover the lower part and both side parts of the battery cell stack 120, and the upper plate 300 may be formed so as to cover an upper part of the battery cell stack 120. Upper edges of both side parts of the lower frame 200 may be coupled to the upper plate 300.

The end plate 400 according to the present embodiment is formed by an injection molding and may be composed of an insulating material. The end plates 400 may be mutually coupled with both side edge parts of the upper plate 300 and both side edge parts of the lower frame 200 while covering the front and rear surfaces of the battery cell stack 120. Through the lower frame 200, the upper plate 300, and the end plate 400, the battery cell stack 120 positioned inside the frame structure and the electrical components connected thereto can be physically protected. When the end plate 400 is formed by an injection molding method, a structure for coupling a low voltage (LV) connector can be formed together. The LV connector can serve to communicate battery cell voltage and thermistor information with the battery pack.

Referring to FIGS. 3 and 5, the front and rear surfaces of the battery cell stack 120 are portions in which the electrode leads 111 and 112 protruding from the electrode assembly are positioned.

First, the battery cell 110 is preferably a pouch-type battery cell, and may be formed in a rectangular sheet-like structure. For example, the battery cell 110 according to the present embodiment has a structure in which two electrode leads 111 and 112 protrude from one end part 114*a* and the other end part 114*b* positioned opposite to each other with respect to the cell body 113, respectively. More specifically, the electrode leads 111 and 112 are connected to an electrode assembly (not shown) and protrudes from the electrode assembly (not shown) to the outside of the battery cell 110. One of the two electrode leads 111 and 112 may be a positive electrode lead 111, and the other may be the negative electrode lead 112. That is, the positive electrode lead 111 and the negative electrode lead 112 may protrude in opposite directions with respect to one battery cell 110.

On the other hand, the battery cell 110 can be manufactured by joining both end parts 114*a* and 114*b* of the cell case 114 and one side part 114*c* connecting them in a state where an electrode assembly (not shown) is housed in a cell case 114. In other words, the battery cell 110 according to the present embodiment has a total of three sealing parts, and the sealing part has a structure of being sealed by a method such as heat fusion, and the remaining other side part can be formed of a connection part 115. The cell case 114 may be formed of a laminate sheet including a resin layer and a metal layer.

The battery cells 110 can be configured in plural numbers, and the plurality of battery cells 110 can be stacked so as to be electrically connected to each other, thereby forming the battery cell stack 120. In particular, as shown in FIG. 3, a plurality of battery cells 110 may be stacked along the x-axis direction. Thereby, the electrode leads 111 and 112 can protrude in the y-axis direction and the −y-axis direction, respectively.

According to an embodiment of the present disclosure, the module mounting parts 310 can be formed at both ends of the upper plate 300. In the present embodiment, the left and right widths of the upper plate 300 may be wider than the distance between both side parts of the lower frame 200. In this case, the portion where the module mounting part 310 is formed on the upper plate 300 may be a portion of the upper plate 300 that further protrudes outward based on the width between both side surface parts of the lower frame 200. A plurality of the module mounting parts 310 may be formed at regular intervals along both ends of the upper plate 300. The module mounting part 310 may be formed in a hole structure. A coupling member can be inserted into the module mounting part 310 of the hole structure to couple the battery pack frame and the upper plate 300.

Conventionally, as shown in FIGS. 1 and 2, two module mounting parts 41 formed protrusively in the direction perpendicular to the plate surface of the end plate 40 were formed for respective end plates 40 at the lower end of the two end plates 40 formed of a metal material. When two module mounting parts are formed at the lower end of the end plate 40 in this way, stress is concentrated on the two module mounting parts when an external force is applied, and the protrusively formed module mounting part 41 or the end plate 40 is broken, or the end plate 40 is deformed and a short circuit between the electrode leads 111 and 112 may occur.

However, according to an embodiment of the present disclosure, as shown in FIG. 3, a plurality of the module mounting parts 310 are formed at both ends of the upper plate 300, so that a four-point fixing structure of the battery module formed only by four module mounting parts according to the related art has been developed into a multi-point fixing structure through a plurality of the module mounting parts 310 as in the present disclosure, and therefore, it has become possible to improve the physical rigidity of the battery module and the battery pack combined to the battery module. In addition, the fixing structure can be formed on the upper plate 300 manufactured by the pressing method, instead of the existing end plate fixing structure of the end plate manufactured by the casting method.

Hereinafter, a battery module including an end plate formed of an insulating member according to an embodiment of the present disclosure will be described with reference to FIGS. 3 and 6 to 8.

Figure 6:
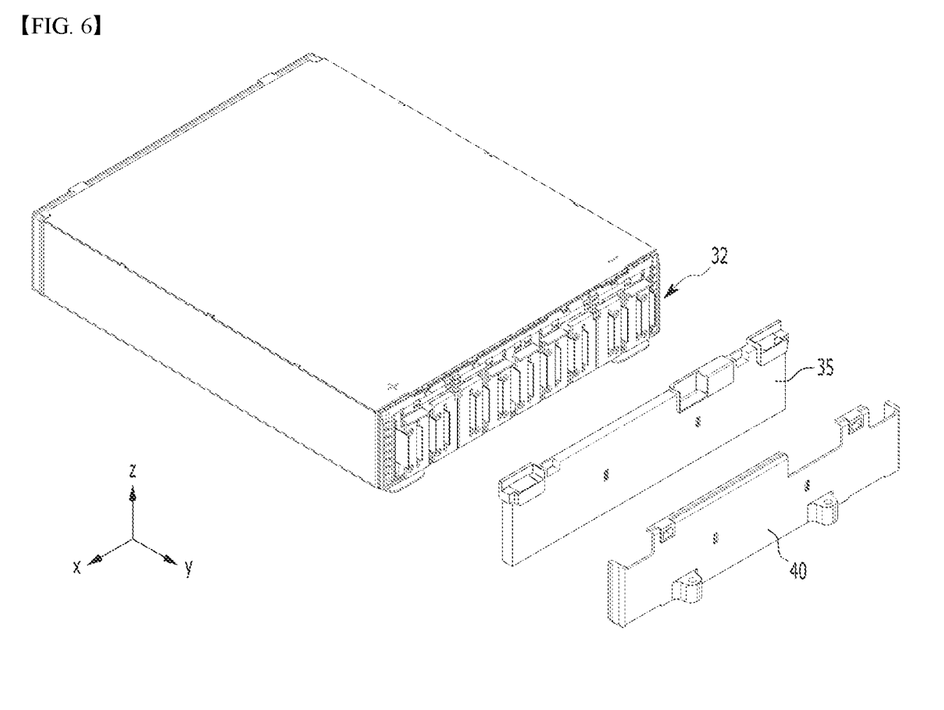
FIG. 6 is a perspective view showing a battery module according to a comparative example of the present disclosure.
Figure 7:
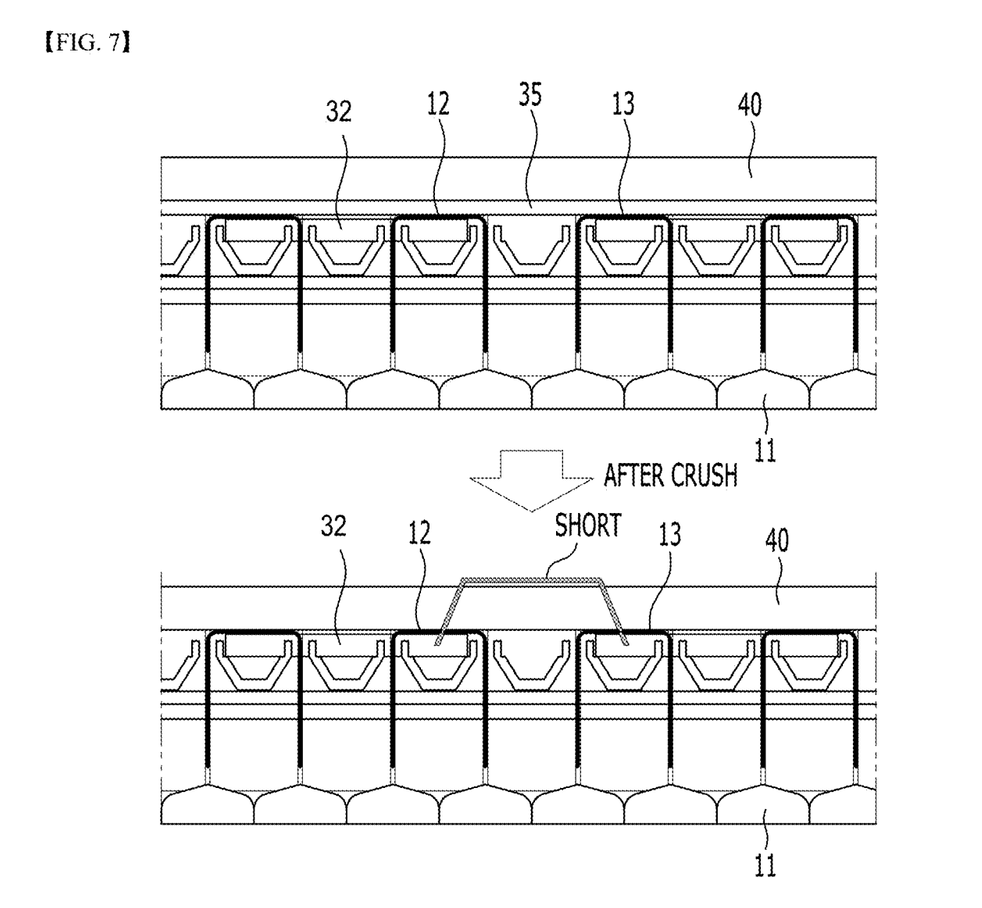
FIG. 7 is a view showing that the electrode leads are short-circuited by a crush in the battery module of FIG. 6.

FIG. 6 is a perspective view showing a battery module according to a comparative example of the present disclosure. FIG. 7 is a view showing that the electrode leads are short-circuited by a crush in the battery module of FIG. 6.

Referring to FIG. 6, the front and rear surfaces of the battery cell stack included in the battery module according to the comparative example are covered with a bus bar frame 32, and the bus bar frame 32 is covered with an end plate 40 formed of a metal material. An insulating cover 35 is formed between the bus bar frame 32 and the metal end plate 40, so that the bus bar and/or electrode lead positioned on the bus bar frame 32 can be insulated from the end plate 40.

Referring to FIG. 7, when a crush occurs in the battery module, it may be most vulnerable in the overall length direction of the battery cell, which is the same direction as the direction in which the electrode leads protrude from the battery cell stack. The reason why the overall length direction is the most vulnerable is because when a crush occurs in the direction in which the electrode leads protrude, the outermost end plate 40 applies a force in the direction in which the battery cells 11 are positioned, and the insulating cover 35 having thin thickness may be broken. When the insulating cover 35 is broken and the metal end plate 40 is pushed into the battery cell stack in this way, the end plate 40 and the electrode leads 12 and 13 may be in contact with each other. In addition, different electrode leads adjacent to each other come into contact with each other. In this case, an electrical connection occurs between the electrode leads 12 and 13 that are electrically spaced apart, and a short circuit phenomenon occurs. At this time, a high current may flow instantaneously in a very small circuit, which may lead to a fire.

Figure 8:
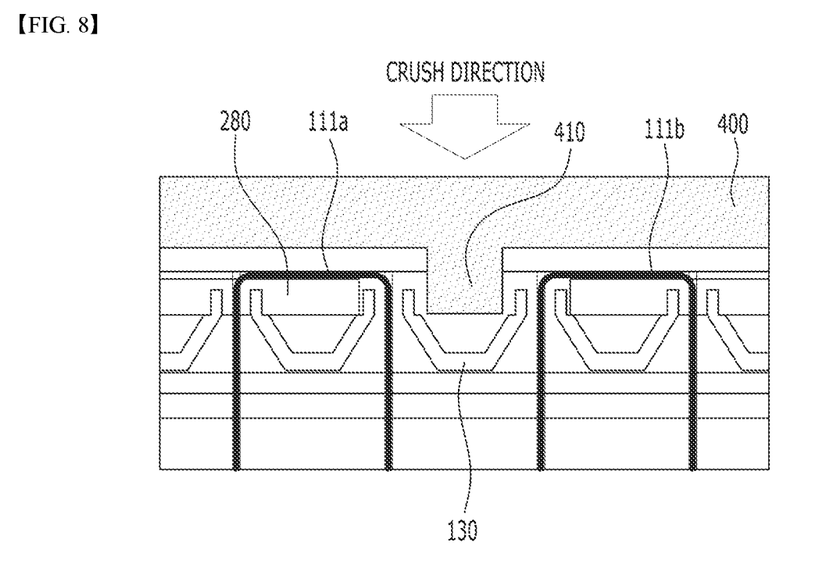
FIG. 8 is a view showing that electrode leads are protected by a crush in the battery module according to an embodiment of the present disclosure.

FIG. 8 is a view showing that electrode leads are protected by a crush in the battery module according to an embodiment of the present disclosure.

Referring to FIGS. 3 and 8, the end plate 400 according to an embodiment of the present disclosure may be formed of an insulating material. In comparison with the comparative examples described in FIGS. 6 and 7, the battery module according to the present embodiment includes an end plate 400 having a relatively thick thickness compared to an insulating cover positioned between the end plate and the bus bar frame to supplement rigidity. In comparison with the insulating cover 35 of the comparative example described in FIGS. 6 and 7, the end plate 400 according to the present embodiment may have a thickness of 2 to 3 times. Further, the end plate 400 according to the present embodiment is formed of an insulating material to replace the existing metal end plate.

Conventionally, metal end plates molded by a casting method were used, but end plates formed of metal are heavy and may break when stress concentrations occur.

However, according to an embodiment of the present disclosure, the end plate 400 is formed of an insulating material, and thus the end plate can be molded by an injection method, thereby manufacturing into end plates 400 that are lighter and more flexible than metal and at the same time, have insulating performance.

A support member 410 is formed on the inner side surface of the end plate 400 according to the present embodiment. The support member 410 has a structure protruding toward the bus bar frame 130. At this time, the support member 410 corresponds to the portion of the bus bar frame 130 positioned between the adjacent electrode leads 111*a* and 111*b*, and even when the end plates 400 are pressed in a crush situation, the short circuit phenomenon can be prevented by maintaining the distance between the electrode leads 111*a* and 111*b*. In other words, not only the end plate 400 of the insulating material does not basically form a short circuit, but also even if the end plate 400 is pushed in the direction of the battery cell stack in a crush situation, the support member 410 can block the crush while abutting on the bus bar frame 130. As an example, the bus bar 280 and the electrode leads 111*a* and 111*b* are not formed on the portion of the bus bar frame 130 where the support member 410 is located. As an example, a plurality of the coupling portions of the bus bar 280 and the electrode leads 111*a* and 111*b* are formed on the bus bar frame 130, and the support member 410 may be positioned between coupling parts adjacent to each other.

Figure 9:
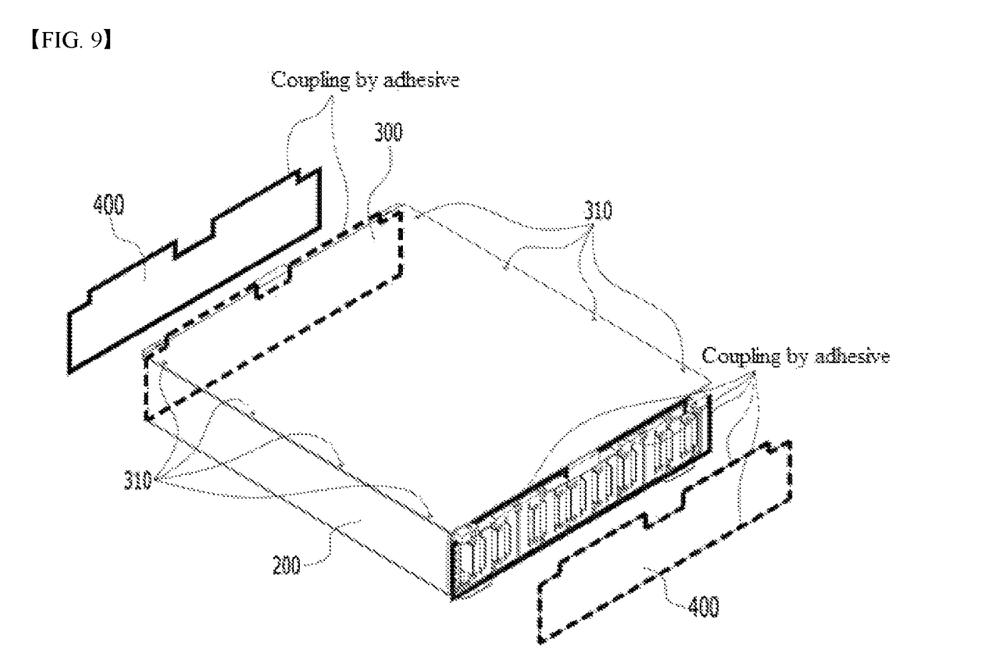
FIG. 9 is a view showing a portion in which the edge portions of the upper plate and the lower frame are coupled to the end plate by an adhesive.

FIG. 9 is a view showing a portion in which the edge portions of the upper plate and the lower frame are coupled to the end plate by an adhesive.

Referring to FIG. 9, the end plate 400 according to an embodiment of the present disclosure can be fixed to at least one of the lower frame 200 and the upper plate 300 by an adhesive. More specifically, the upper end edge of the end plate 400 can be adhered to the edge part of the upper plate 300, and both side ends and lower end edges of the end plate 400 can be joined with edge parts of the lower frame 200. The method of coupling the end plate and at least one of the lower frame and the upper plate can be coupled using a hook in addition to the method using an adhesive, but is not limited thereto, and various types of coupling methods can be adopted.

Conventionally, a separate fixing structure for coupling the end plate was required, but according to an embodiment of the present disclosure, the end plate formed of an insulating material can be fixed by an adhesive, whereby a separate fixing structure is not required, and the structure of the battery module is simplified, thereby reducing the manufacturing process and reducing the manufacturing cost.

The above-mentioned battery module can be included in the battery pack. The battery pack may have a structure in which one or more of the battery modules according to the present embodiment are gathered, and packed together with a battery management system (BMS) and a cooling device that control and manage battery's temperature, voltage, etc.

The above-mentioned battery module or battery pack can be applied to various devices. Such a device can be applied to a vehicle means such as an electric bicycle, an electric vehicle, or a hybrid vehicle, but the present disclosure is not limited thereto, and is applicable to various devices that can use a battery module.

Although the invention has been shown and described above with reference to the preferred embodiments, the scope of the present disclosure is not limited thereto, and numerous other modifications and improvements made by those skilled in the art by using the basic principle of the invention defined in the appended claims also fall within the spirit and scope of the present disclosure.

The invention claimed is:

1. A battery module comprising:
   a battery cell stack in which a plurality of battery cells are stacked in a first horizontal direction,
   a module frame for housing the battery cell stack,
   an end plate for covering one of a front surface and a rear surface of the battery cell stack and coupled to the module frame,
   a bus bar frame positioned between the battery cell stack and the end plate, and a bus bar positioned on the bus bar frame, and
   at least one support member formed on an inside surface of the end plate, the at least one support member protruding toward the battery cells stack,
   a plurality of electrode leads extending through and coupled to the bus bar,
   a vertical opening between a first electrode lead and a second electrode lead of the plurality of electrode leads,
   wherein the end plate is formed of an insulating material, and
   wherein the at least one support member extends in a vertical direction and into the vertical opening and is spaced from side edges of the end plate.

2. The battery module according to claim 1, wherein the front surface and the rear surface of the battery cell stack are positioned in a second horizontal direction in which the electrode leads of the battery cells protrude, the second horizontal direction being perpendicular to the first horizontal direction.

3. The battery module according to claim 1, wherein the module frame comprises a lower frame on which the battery cell stack is mounted and an upper plate that covers an upper part of the battery cell stack, and at least one module mounting part is formed at each end of the upper plate.

4. The battery module according to claim 3, wherein the end plate is fixed to at least one of the lower frame and the upper plate by an adhesive.

5. The battery module according to claim 3, wherein the end plate is coupled to at least one of the lower frame and the upper plate by a hook structure.

6. The battery module according to claim 3, wherein the upper plate protrudes more than a width between side surface parts of the lower frame to form a protruding part, and wherein the at least one module mounting part is formed on the protruding part.

7. The battery module according to claim 6, wherein the at least one module mounting part is a plurality of mounting parts along opposite sides of the upper plate.

8. The battery module according to claim 6, wherein the at least one module mounting part is a hole structure.

9. The battery module according to claim 3, wherein the lower frame comprises a bottom part, and side surface parts formed by bending at opposite sides of the bottom part.

10. The battery module according to claim 9, wherein a width of the upper plate is wider than a distance between side parts of the lower frame.

11. The battery module according to claim 1, wherein the end plate is formed by injection molding.

12. A battery pack comprising the battery module according to claim 1.

13. The battery module according to claim 1, wherein the at least one support member is spaced from the bus bar frame.

14. The battery module according to claim 1, wherein the at least one support member is a plurality of support members spaced from each other in the first horizontal direction.

15. A battery module comprising:
a battery cell stack in which a plurality of battery cells are stacked in a first direction,
a module frame for housing the battery cell stack,
an end plate for covering one of a front surface and a rear surface of the battery cell stack and coupled to the module frame,
a bus bar frame positioned between the battery cell stack and the end plate, and a bus bar positioned on the bus bar frame,
wherein the electrode leads are coupled to the bus bar, and coupling parts of the electrode leads and the bus bar are formed in plural numbers,
wherein the end plate is formed of an insulating material,
wherein the front surface and the rear surface of the battery cell stack are positioned in a second direction in which the electrode leads of the battery cells protrude, the second direction being perpendicular to the first direction,
wherein a support member is formed on an inside surface of the end plate, and the support member has a structure protruding toward the bus bar frame, and
wherein the support member is positioned between the coupling parts adjacent to each other of the electrode leads and the bus bar.

* * * * *